Oct. 23, 1956    A. A. KRISTOFF ET AL    2,768,043
ADJUSTABLE SERVICE TRAY FOR USE IN MOTOR VEHICLES
Filed Dec. 20, 1954    2 Sheets-Sheet 1

INVENTORS
Andrew A. Kristoff,
& H. E. Hammerli
BY Victor J. Evans & Co.

ATTORNEYS

Oct. 23, 1956 A. A. KRISTOFF ET AL 2,768,043
ADJUSTABLE SERVICE TRAY FOR USE IN MOTOR VEHICLES
Filed Dec. 20, 1954 2 Sheets-Sheet 2
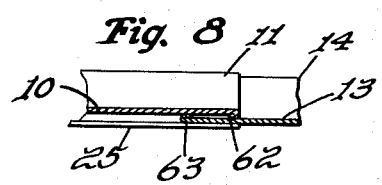
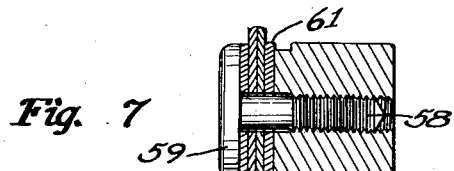
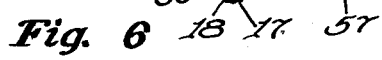
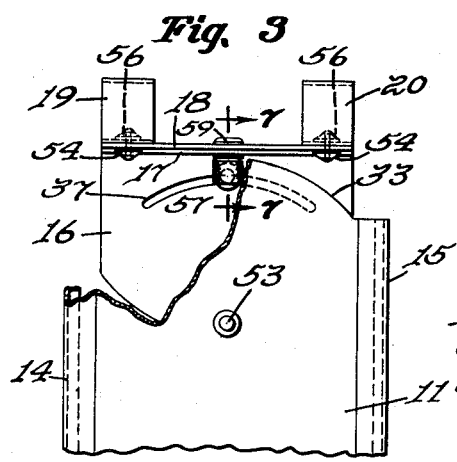
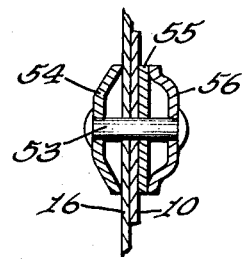
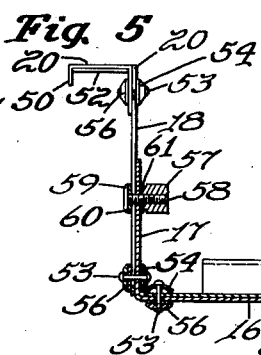
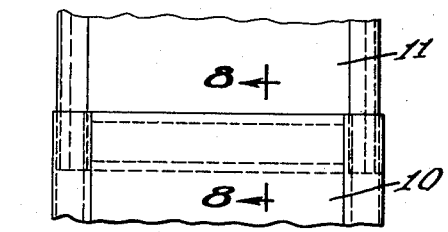
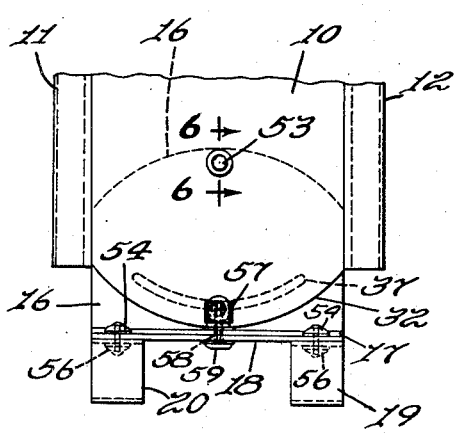
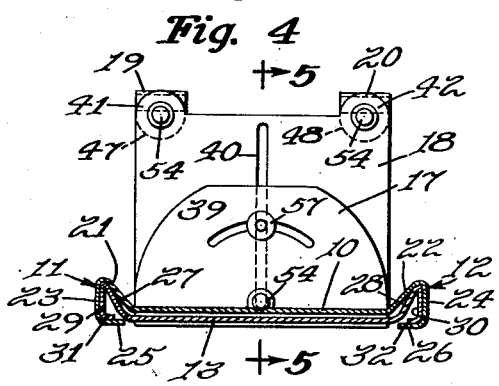
INVENTORS
Andrew A. Kristoff
& H. E. Hammerli
BY Victor J. Evans & Co.
ATTORNEYS United States Patent Office 2,768,043
Patented Oct. 23, 1956

2,768,043
ADJUSTABLE SERVICE TRAY FOR USE IN MOTOR VEHICLES

Andrew A. Kristoff and Harold E. Hammerli, Topeka, Kans.

Application December 20, 1954, Serial No. 476,366

1 Claim. (Cl. 311—21)

This invention relates to service trays particularly adapted for use in motor vehicles and of the type adapted to extend from one side of the vehicle to the other; and in particular, an elongated tray formed with telescoping sections and having spaced pivotally mounted supporting hooks at each end whereby the base of the tray is adapted to be adjusted to a horizontal position to compensate for uneven surfaces upon which a vehicle in which the tray is used may be positioned.

The purpose of this invention is to provide a service tray for use in motor vehicles in which the length of the tray is adapted to be adjusted to correspond with the width of a vehicle and also in which the base of the tray is adapted to be adjusted to a level position regardless of the position of the vehicle.

Various types of service trays have been used in motor vehicles and although such trays are adjustable to compensate for vehicles of different sizes it has been found difficult to combine the adjusting means with means for leveling the tray when the vehicle is positioned upon an inclined or uneven surface. With this thought in mind, this invention contemplates an elongated tray formed with telescoping sections with L-shaped hangers at the ends in which horizontal legs of the hangers are pivotally connected to ends of telescoping sections and also in which the horizontally disposed legs of the hangers are pivotally connected to the vertically disposed legs to permit tilting the base of the tray to correspond with the position of a vehicle in which the tray is used.

The object of this invention is, therefore, to provide means for adjustably connecting the ends of a telescoping tray to sides of a motor vehicle body whereby the tray is adapted to be suspended in a level position from upper edges of side walls of the vehicle.

Another object of the invention is to provide an adjustable service tray for motor vehicles that is adapted to be used in vehicles now in use without changing parts of the vehicle.

A still further object of the invention is to provide an adjustable tray for use in a motor vehicle in which means is provided for leveling the base of the tray and in which the tray is of a simple and economical construction.

With these and other objects and advantages in view, the invention embodies a pair of telescoping sections including base plates with substantially triangular shaped flanges at the edges and L-shaped hangers including horizontally disposed and vertically disposed plates with the horizontally disposed sections pivotally connected to the base plates of the telescoping sections and with the vertically disposed portions pivotally connected to vertically positioned end plates on the upper edges of which hooks are pivotally mounted.

Other features and advantages of the invention will appear from the following description, taken in connection with the drawings, wherein:

Figure 3 is a plan view of the tray with parts broken away to illustrate mounting elements thereof.

Figure 4 is a cross section through the tray taken on line 4—4 of Figure 1.

Figure 5 is a longitudinal section through the suspending hanger at one end of the tray, said section being taken on line 5—5 of Figure 4.

Figure 6 is a section taken on line 6—6 of Figure 3 with the parts shown on an enlarged scale illustrating a pivotal or swivel connection between parts of the tray.

Figure 7 is a longitudinal section taken on line 7—7 of Figure 3 with the parts shown on an enlarged scale illustrating one of the locking screws or studs for retaining parts of the tray in adjusted positions.

Figure 8 is a longitudinal section taken on line 8—8 of Figure 3 also with the parts shown on an enlarged scale illustrating the rolled edges of the telescoping sections of the tray.

Figure 1:
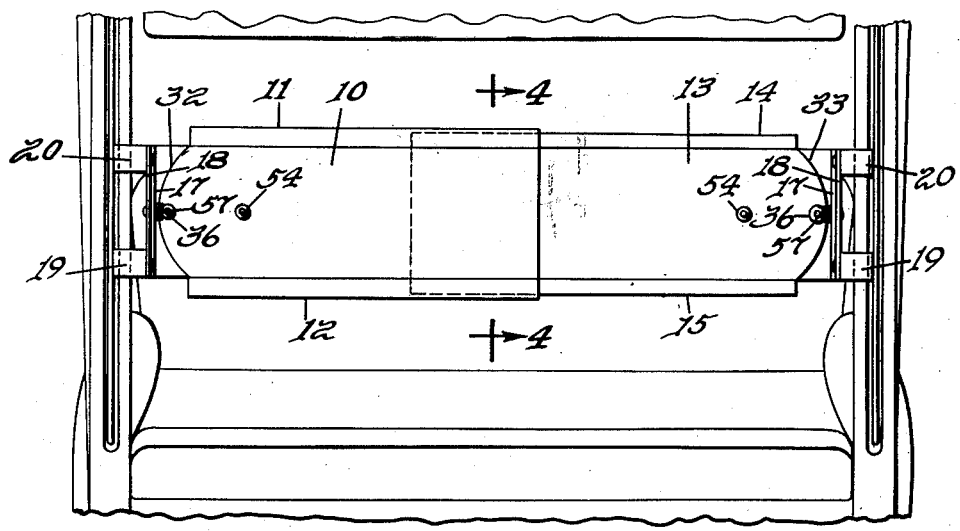
Figure 1 is a plan view showing an intermediate portion of a motor vehicle body illustrating the position of the adjustable service tray of this invention with the tray suspended between side walls of the vehicle body.

Referring now to the drawings, wherein like reference characters denote corresponding parts, the improved adjustable service tray of this invention includes a base 10 having triangular shaped flanges 11 and 12 at the edges, a base 13 also having triangular shaped flanges 14 and 15 at the edges, the flanges 14 and 15 being adapted to telescope or slide into the flanges 11 and 12 and hangers, each having an L-shaped unit with a horizontally disposed section 16 and a vertically disposed section 17, vertically disposed end plates 18, hooks 19 and 20, and suitable fastening elements for securing the parts in assembled relation.

As illustrated in Figure 4, the flanges 11 and 12 of the base plate 10 are provided with inclined inner surfaces 21 and 22, vertically disposed outer surfaces 23 and 24 and horizontally disposed lower sections, as indicated by the numerals 25 and 26. These flanges provide triangular shaped channels in which corresponding flanges 13 and 15 of the base 13 are adapted to slide.

Also as illustrated in Figure 4, the flanges 13 and 15 are provided with inclined inner surfaces 27 and 28, and vertically disposed outer walls 29 and 30, respectively, and the vertically disposed walls are provided with lower lips or flanges 31 and 32.

Figure 2:
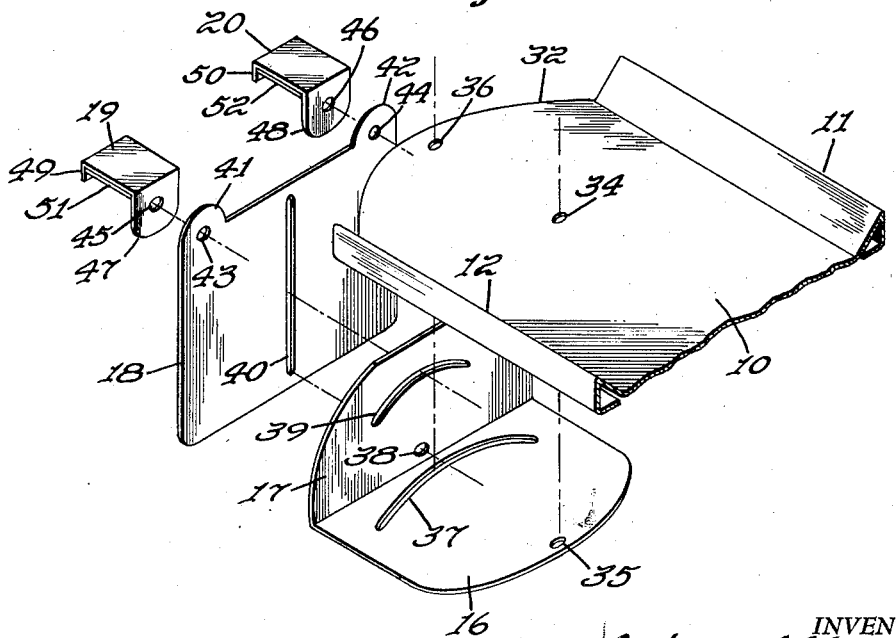
Figure 2 is an exploded perspective view illustrating the adjustable suspending elements or hangers positioned at the extended ends of the sections of the tray.

The extended ends of the base portions of the telescoping sections of the tray are provided with arcuate surfaces, as indicated by the numerals 32 and 33 and, as illustrated in Figure 2, the base 10 is provided with an opening 34 that is positioned to register with an opening 35 in the horizontal section 16 of the L-shaped portion of the hanger and an opening 36 is positioned to register with an arcuate slot 37 that is formed on a radius from the opening 35 whereby a fastening element inserted through the opening 36 is adapted to swing throughout the length of the slot 37 with the parts pivotally connected through the openings 34 and 35.

The vertically disposed section 17 of the L-shaped portion of the hanger is provided with an opening 38 and an arcuate slot 39, the slot 39 being adapted to be described from the center of the opening 38 and both the opening 38 and slot 39 being adapted to register with a vertically disposed slot 40 in the end or vertically disposed plate 18.

The upper edges of the vertically disposed plates 18 are provided with ears 41 and 42 in which openings 43 and 44, respectively, are provided, and the openings 43 and 44 are adapted to register with openings 45 and 46 in flanges 47 and 48 of the hooks 19 and 20. The opposite edges of the hooks are provided with downwardly extended lips 49 and 50 and the inner surfaces are coated with layers of resilient material, as indicated by the numerals 51 and 52.

The parts are connected with friction fastening elements, as shown in detail in Figure 6, wherein rivets 53 extend through cup washers 54 on one side of a connection and through washers 55 and spring washers 56 on the opposite side. By this means plates, such as the plates 10 and 16, may be frictionally connected so that one plate is free to pivot or slide in relation to the other.

The vertically disposed sections of the L-shaped members of the hangers are adapted to be clamped in adjusted positions on the end of vertically disposed plates 18 with thumb nuts 57 which are threaded on studs 58 extended from heads 59, as shown in Figure 7, the studs extending through arcuate slots 39 in the vertically disposed portions 17 and also through the slots 40 of the plates 18. Washers 60 may be provided under the heads 59 and similar washers 61 between the thumb nuts 57 and plate 17.

It will be understood that the fasteners illustrated in Figure 6 may be replaced with the clamping elements shown in Figure 7 in other connections of the tray if desired.

As illustrated in Figure 8, the inner edges of the base plates of the sections of the tray are turned under providing a flange 62 on the plate 10 and a similar flange 63 on the plate or base 13.

With the parts designed and assembled in this manner, the telescoping sections are adapted to be adjusted to compensate for the width of a motor vehicle in which it is desired to use the tray and with the parts in position the tray is adapted to be adjusted until the base thereof is level or in a horizontal plane and with the tray level the thumb nuts 57 are turned to clamp the parts in the adjusted positions. By this means the tray is adapted to be adjusted to correspond with sizes of different motor vehicles and is also adapted to be adjusted to a level position in relation to a surface upon which the vehicle may be positioned.

It will be understood that modifications, within the scope of the appended claim, may be made in the design and arrangement of the parts without departing from the spirit of the invention.

What is claimed is:

In a service tray, the combination which comprises telescoping tray sections having flat base plates with channel shaped elements at the edges, hanger elements having vertically disposed sections and horizontally disposed sections positioned at the ends of the telescoping sections, the vertical and horizontally disposed sections of the hanger elements having openings and arcuate slots therein, the arcuate slots being positioned on radii centered on said openings, resilient fastening elements extended through openings of the tray sections and horizontally disposed sections of the hanger elements, vertically disposed end plates having vertically positioned slots therein, resilient fastening elements extended through the openings of the vertically disposed sections of the hanger elements and slots of the end plates, clamping elements extended through the arcuate slots of the vertically disposed plates of the hanger elements and slots of the end plates, spaced hooks on upper edges of said end plates, and resilient fastening elements securing the hooks to said end plates.

References Cited in the file of this patent

UNITED STATES PATENTS

| | | |
|---|---|---|
| 535,945 | Donald | Mar. 19, 1895 |
| 587,864 | Ryan et al. | Aug. 10, 1897 |
| 729,078 | Maxwell | May 26, 1903 |
| 1,767,950 | Westbrook | June 24, 1930 |
| 1,770,955 | Storm | July 22, 1930 |
| 1,872,740 | James | Aug. 23, 1932 |
| 2,483,920 | McLean et al. | Oct. 4, 1949 |
| 2,584,557 | Cuthberson | Feb. 5, 1952 |
| 2,704,235 | Bion | Mar. 15, 1955 |